LEGEND

INDICATES LAYER HAS STORAGE FUNCTION

INDICATES LAYER HAS CONDUCTING FUNCTION

INVENTOR
Sigfrid Schweizerhof

BY Spencer & Kaye

ATTORNEYS

March 10, 1970 S. SCHWEIZERHOF 3,500,347

INTEGRATED DEVICE

Filed Jan. 27, 1965 3 Sheets-Sheet 2

INVENTOR
Sigfrid Schweizerhof

BY Spencer & Kaye

ATTORNEYS

INVENTOR
Sigfrid Schweizerhof

BY Spencer & Kaye

ATTORNEYS

United States Patent Office 3,500,347

Patented Mar. 10, 1970

3,500,347

INTEGRATED DEVICE

Sigfrid Schweizerhof, Backnang, Wurttemberg, Germany, assignor to Telefunken Patentverwertungs-G.m.b.H., Ulm (Danube), Germany Filed Jan. 27, 1965, Ser. No. 428,376
Claims priority, application Germany, Jan. 27, 1964, T 25,500
Int. Cl. G11b *5/00*
U.S. Cl. 340—174 7 Claims

ABSTRACT OF THE DISCLOSURE

An integrated circuit using thin magnetic storage layers for storing, switching or logically combining information. The arrangement has a system of insulated conductors printed on a soft magnetic, highly permeable base forming interaction regions which correspond to the desired operative function. Non-magnetic layers are disposed on the conductor system in the interaction regions and thin magnetic storage layers applied thereto; the latter thus cover the non-magnetic layers and contact the soft magnetic base in the zones around the interaction regions.

The present invention relates generally to the computer art, and, more particularly, to arrangements for the magnetic storage, switching or logic combination of information in electronic computers, electronic allotters, electronic automatic exchanges and like devices, and in measuring instruments.

The majority of known arrangements of this type (e.g., E. Schäfer, "Elektronische Rechenanlagen" 2 (1960), No. 4, pages 183–193) are based on the individual wiring of individual magnetic storage, switching or logic elements, for example, of ferrite cores, of toroidal cores composed of very thinly rolled metal strips, or of thin cylindrical or toroidal metal layers which are precipitated by electrolytic or electrochemical means on appropriate supports.

Such arrangements have disadvantages which have become more and more of a hindrance to the rapid further development of the mentioned electronic devices, particularly for that of computer storage. For high bit capacities, they require too much room and excessively high operating voltages and they suffer from disturbing signal transfer times. Furthermore, with very high capacities, the wiring of individual magnetic elements is very expensive and requires much time which is intolerable. It may be estimated, for example, that storage capacities of the order of magnitude of $10^9$ bits, which appear not improbable for future computers, can no longer be achieved by the above conventional means because of the expenditure in costs and time. So-called integrated techniques have therefore already long been sought wherein the storage, switching or logic elements are very small and no longer have to be produced and manipulated individually, but are made and electrically interconnected in a common process (e.g., J. A. Rajchmann, RCA Review XXIII, 1962, No. 2, pages 137–151.)

However, the efforts in this direction (E. Schäfer, "Elektronische Rechenanlagen" 2, 1960, No. 4, pages 183–193, and J. A. Rajchmann, Proc. IRE 49, 1961, pages 104–122) have only led so far to partially integrated techniques which are unsatisfactory in various respects. Thus, ferrite toroidal cores have been inserted into sheets of insulating material and provided by photochemical processes with a printed circuit which extends through the inside of the toroidal cores. (E. A. Guditz, Electronics 30, 1957, No. 6, pages 160–163). This process still requires the production, testing and manipulation of individual toroidal cores, that is to say, operations which become extremely difficult and expensive with extremely small cores. In addition, it makes very heavy demands on the precision of the optical apparatus necessary.

Storage units are also being built in which a relatively large number of storage locations is provided in the form of holes, each in an apertured ferrite plate (J. A. Rajchmann, Proc. IRE 45, 1957, pages 325–334, and S. Schweizerhof, "Nachrichtentechnische Fachberichte," No. 21, 1960, pages 87–92). One of the required working windings is metallized onto each of these plates in such a manner that it passes in meander form through the holes. A relatively large number of such apertured plates is then stacked to form a pile and the other wire windings are threaded through them jointly. The economic and spatial advantages of this arrangement are, however, far from adequate for extremely high capacities. In addition, the shortest possible switching times which can be achieved are relatively long for various reasons.

Meanwhile, the last-mentioned method has been brought closer to true integration (R. Schabender et al. RCA-Rev. 23, 1962, No. 4, pages 39 to 66) by replacing each store aperture by a plurality of closely adjacent extremely small individual apertures by means of an electron-beam drill ("micro-aperture plate store") and by connecting these multiple apertures by thermal and photochemical metallizing. Although this method leads to considerable progress with respect to space requirements, current consumption and switching time, nevertheless it is extremely difficult technologically.

Further attempts at achieving an integrated technique were made on the basis of thin metallic storage films (e.g., E. E. Bittmann, IRE Trans. Electronic Comp. 8, 1959, No. 2, pages 92–97, and W. E. Proebster, Int. Solid-State Circuits Conf., Philadelphia, pages 38 and 39). With the very thin films (thickness up to about 0.5/$\mu$m.), and integrated technique is fundamentally favored as a result of the fact that even with small dimensions in the plane of the film, the de-magnetizing factor is so low that it is possible to dispense with a closed magnetic iron circuit. As a result, the elements can be brought close together and a simple close stacking of the storage elements and of the writing and reading lines is possible. The switching time of such storage elements is extremely short (a few $10^{-9}$ sec.). On the other hand, these storage elements only produce adequate signal voltages when these short switching times are fully utilized, that is to say, only when operated with a correspondingly high-speed electronic system. Such an electronic system, including the associated conductor system, is very expensive, however, and is therefore out of the question for large storage capacities. Moreover, with large capacities, the high switching speed can not be fully utilized in view of the signal transfer times. In addition, the reproducibility of the extremely thin films and the uniformity of very numerous elements in a relatively large unit still involve considerable practical difficulties at the present time.

Although the longer switching times of thicker metallic storage layers (about 0.02 $\mu$s. to a few $\mu$s.) are better adapted to the requirements of large storage capacities in view of what has been said above, it is not possible to dispense with a completely closed magnetic circuit for the storage or logic elements. Nevertheless, in order to achieve an integrated manufacturing technique, various proposals have been made hitherto. For example, thin rolled sheets with a rectangular hysteresis loop have been divided in individual elements and provided with one or more apertures by a photo-etching technique, which elements have been mechanically held together by means of a silicon-rubber coating and printed with the necessary switching circuits (G. R. Briggs and J. W. Truska, "Journ. Appl. Phys." Suppl., vol. 33, 1962 No. 3, pages 1065–1066). In this manner, relatively high bit densities can be achieved with low operating currents. But the switching times which can thus be achieved are very great, the magnetic inhomogeneity of the rolled sheet prevents the production of units with high bit capacities and the accurate production by a metallizing process of the connections passing through the apertures is technologically difficult.

It has also been proposed to perforate thin sheets of insulating material with rectangular apertures and to coat the remaining webs by means of an electrolytically deposited film with storage properties after the perforated plates have first been printed with a suitable system of writing and reading lines, see U.S. Patent No. 3,138,785 filed May 21, 1959. In contrast to that previously mentioned, this method has the advantage that the circuits to be printed (apart from a few exceptions) do not have to be taken through produced apertures. The imperfection of perforating techniques, however, leads to difficulties in forming a homogeneous and undisturbed film over the whole extent of the webs and also limits the miniaturizing of the individual elements below a certain size so that the switching current necessary also remains unsatisfactorily heavy.

The aim of an integrated technique has also been approached in the form of "woven stores," where again two different methods have been proposed. With the first (A. H. Bobeck, "Bell System Techn. J." 36, 1957, No. 11, pages 1319–1340, and U. F. Gianola "J. Appl. Phys." 34, 1963, No. 4, part 2, pages 1131–1132) only the wires in one coordinate direction are coated with a magnetic storage film, while the wires in the other coordinate direction only act on the film from outside, that is to say without closing the circuit through iron. With the other method (DBP 1,062,036 and DBP 1,084,955) the points of intersection between the cooperating lines are enveloped in a storage layer. Both proposals presumably render possible a very high specific storage capacity with very low operating currents. Nevertheless, their manufacture still requires a certain amount of highly skilled manual operations and, in addition, the easy deformation of the storage wires and of the wire networks may lead to unwanted permanent local variations in the storage characteristics, which is a disadvantage.

In another attempt at an integrated magnetic store technique (A. G. Bobeck, "Proc. Intermag Conference," 1963, pages 3–2–1/3–2–6), a storage film which is produced by rolling or by electrolytic deposition on a carrier plate, is pressed onto a highly permeable ferrite plate which is profiled like a waffle iron, so that the two parts are in contact at numerous small pole surfaces separated by narrow grooves. In this case, only the parts of the storage foil which are situated between adjacent contact areas and which bridge the grooves serve for the storage while the magnetic circuit is closed through the soft magnetic ferrite base plate. The energizing writing lines and the induced reading lines are placed in the grooves in the ferrite plate which cross one another. This method has the advantage that, despite the use of relatively thick storage layers, threading of the windings through closed cores is dispensed with. In addition it also has further advantages. The length of the magnetic path through the individual storage element is considerably shortened in comparison with other methods, leading to a reduction in dimensions, a corresponding reduction in the current consumption or in the switching time, and a reduction in the pulse transfer times. With a suitable mode of operation, bipolar output signals are obtained and a minimum direct coupling between interrogating and reading lines. A considerable disadvantage of this method, however, is the expense for the grinding of the fine grooves in the ferrite plate and the extremely careful lapping of its surface. In addition, the size of the ferrite plate and hence its bit capacity is limited by the high requirements with regard to the evenness of the two surfaces to be brought into contact.

With the foregoing in mind, it is a main object of the present invention to provide an arrangement for the storage, wiring or logic combination of information on the basis of thin magnetic storage layers, which arrangement renders possible a greater integration and a greater economy than the known arrangements discussed above and at the same time avoids their disadvantages.

Another object of the invention is to provide an arrangement of the character described wherein the stability of the storage condition cannot be reduced or endangered by unwanted demagnetizing air gaps.

A further object is to provide such an arrangement which does not involve any difficult mechanical machining of the soft magnetic base and this can be curved and relatively large.

These objects and others ancillary thereto are accomplished according to preferred embodiments of the present invention wherein a system of insulated conductors corresponding to the particular function is printed on a soft-magnetic and highly permeable base. A non-magnetic layer of adequate thickness is applied to those regions of the conductor system in which the interaction takes place between the conductors and the storage layer (function regions), and the magnetic storage layer is deposited on these function regions and on zones around the function regions which are not covered by the non-magnetic layer.

In this manner only that part of the storage layer which covers the function regions need be energized, while the rest of the layer forms the path for the magnetic storage or switching flux into the soft-magnetic base where the circuit is closed with substantially no resistance.

In this arrangement as in the known storage discussed above with a profiled ferrite plate and superimposed storage layer, the active magnetic path length of the storage or switching element, and hence also the current consumption and/or the switching time is reduced to a minimum. The base need not be of ferrite but may be of highly permeable metal foils or films, which are applied to or deposited on a support. The arrangement does not require any manual insertion of windings. All-together, as will be explained hereinafter, the arrangement can be produced by a completely integrated technique, that is to say without the slightest manual intervention in the interior of a unit that comprises numerous individual elements.

In addition, the arrangement according to the invention permits a particularly simple production and use of magnetic anisotropy in the storage film. This serves in the first instance to stabilize the state of remanence (rectangular hysteresis loop). It may also be used, however, to accelerate the switching operation by a changeover to a non-coherent rotation of the magnetization vector, and for a rapid non-destructive reading of information. Hitherto it has only been possible to use these two advantageous modes of operation with relatively thick magnetic storage layers if these were present in elongated cylindrical form with a very low axial demagnetization factor, that is to say in an unfavorable form for an integrated technique.

Additional objects and advantages of the present invention will become apparent upon consideration of the following description when taken in conjunction with the accompanying drawings in which:

FIGURE 1*a* is a plan view of a storage element of the present invention.

FIGURE 1*b* is an enlarged sectional view taken substantially along the plane defined by reference line A—A.

Figure 1:
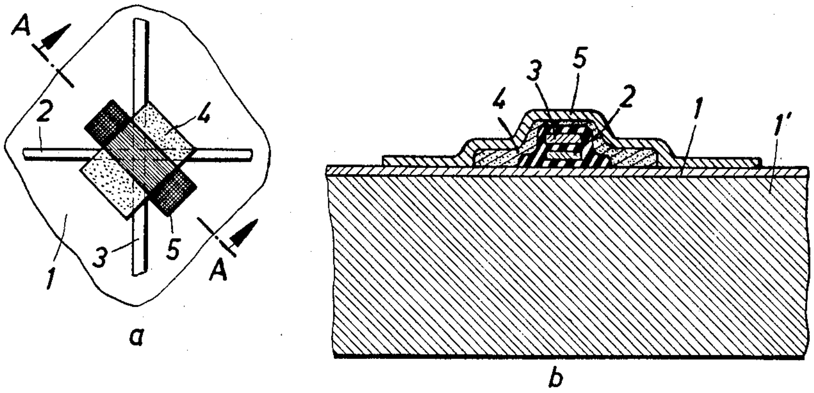

In FIGURE 1, the storage or switching cell is applied to a highly permeable base 1. This may comprise either a thin soft magnetic metal foil or metal layer, for example 3 μm. thick, which, in turn, is stuck on or is galvanically deposited on a plate 1' such as thick non-magnetic base plate, or a thick soft magnetic ferrite plate. The two insulated conductors 2 and 3, which cross one another (and which, in a word-organized store, may have the functions of the word wire and interrogating wire, or of the digit wire and reading wire, respectively) are first applied to this base one after the other by known methods, for example by means of photochemical etching and electrical insulation of electrolytically or electrochemically applied copper deposits. The conductor intersection and its immediate vicinity is then covered with a sufficiently thick varnish coating 4 (e.g. 10 to 100 μm.), after which the actual storage layer 5 is deposited electrolytically or electrochemically.

In the intersection region (function region) indicated by parallel lines in the drawing, the storage layer is spaced from the soft magnetic base by the film of varnish 4 and serves as a storage element, whereas in the region indicated by crossed lines, it is in direct contact with the base and conducts the magnetic flux into the base. In the case of a ferrite base, electrolytic deposition of the storage layer necessitates a very thin chemical premetallizing on the ferrite surface. Although such a metallic intermediate layer represents a dynamic resistance to the conduction of flux to the base (skin effect), this can be kept sufficiently low. Compositions and deposition conditions are known for the storage layer which afford favorable storage properties, particularly under the action of magnetic fields during the deposition. A known example is a nickel-iron alloy with about 80–82% Ni. The magnetic field applied during the deposition may be produced with a suitable magnetic strength and direction (at 45° to the conductor intersection in FIGURE 1) by means of direct currents in the conductors 2, 3.

Figure 2:
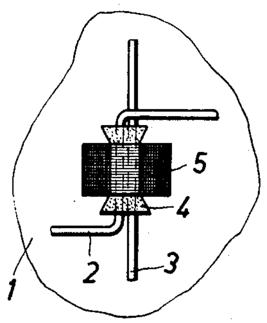
FIGURE 2 is a plan view of another arrangement of a storage element.

FIGURE 2 shows a storage cell according to the invention wherein the active length of the storage layer and hence the necessary energizing current is reduced to a minimum by the closely adjacent parallel position of the two conductors 2 and 3.

Figure 3:
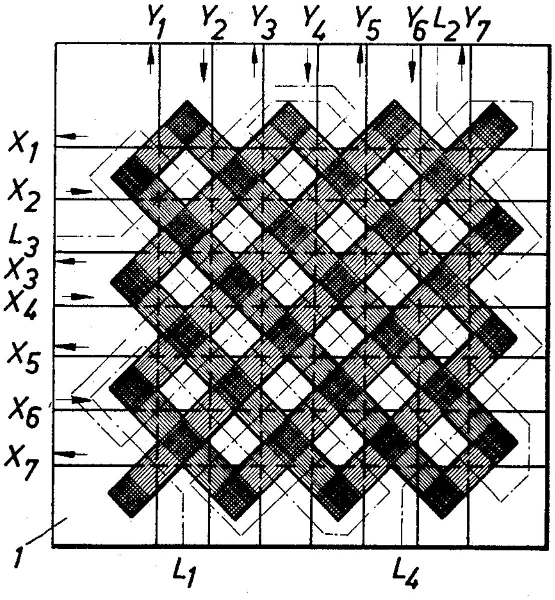
FIGURE 3 is a plan view of a matrix constructed in accordance with the present invention.

FIGURE 3 illustrates diagrammatically and on an enlarged scale the construction of a storage matrix working with current-coincidence and using the elements shown in FIGURE 1. The parallel lines again represent the storage layer which is deposited in the manner described above at the end of the production process. The crossed line portions rest directly on the soft magnetic base 1, while the parallel line webs lying between them and forming the actual storage cells bridge the crossed writing and interrogating wires $x_1$ to $x_7$, $y_1$ to $y_7$ and the two reading wires to be connected in series and having the ends $L_1$, $L_2$, $L_3$, $L_4$ by means of a spacing non-magnetic film. In the intetrior of the matrix, the magnetic flux from four storage cells, and at the edges thereof, that from two storage cells, is conveyed simultaneously and in the same direction through each contact area between storage film and base (crossed lines) except for the portions at the upper right and lower left. By this means, the specific store capacity is increased accordingly, without any harmful coupling of adjacent storage locations taking place. The crossed arrangement of the wires only leads to a very slight direct coupling between interrogating wires and reading wires. When the matrix is used in word-organized storage arrangements, the *y*-wires serve for the word and interrogation currents, the *x*-wires for the digit currents or as reading wires, and the separate reading wires shown in chain lines may be omitted. When used for coincidence storages, both are used for the coordinate currents, while the diagonal wires, shown in broken lines, are printed in addition for the reading. The latter wires are arranged in such a manner that disturbance voltages are largely compensated.

The storage or switching matrix described does not have to be made plane but may also be cylindrically curved for example.

Figure 4:
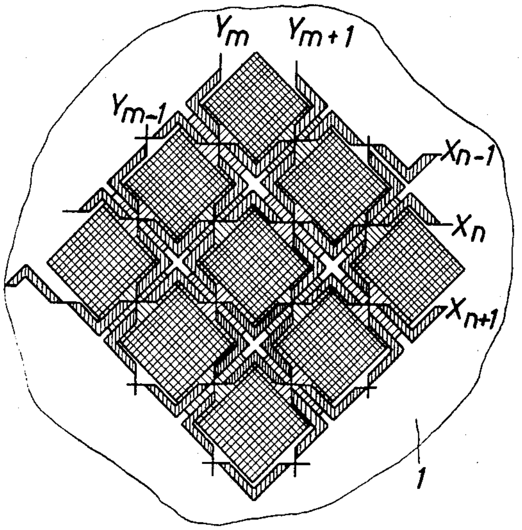
FIGURE 4 is a fragmentary plan view of another matrix.

FIGURE 4 shows diagrammatically, as a further example of an embodiment, a section of a storage matrix in which the length of the active portion of the storage cell (parallel lines) is shortened in favor of its width so that the ratio of switching current to signal voltage is correspondingly more favorable. This is achieved as a result of the fact that the word and digit wires $Y_m$, $X_n$ ($n$, $m$=serial numbers) run substantially parallel under the storage-layer bridges. In order to keep the wire capacitance low despite this, the crossing over of the wires is localized to a small region and is effected with reduction of the wire cross section. In cases where the wire capacity is of minor importance, wires can also be printed one on top of the other in the storage region, as a result of which the necessary energizing current can be still further reduced.

Figure 5:
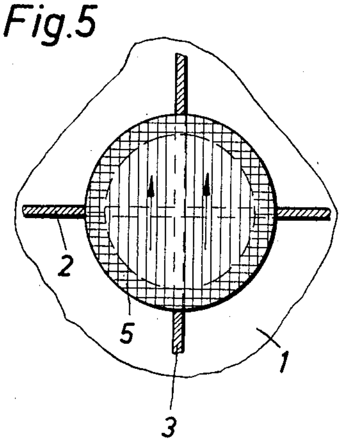
FIGURE 5 is a plan view of another storage element having a magnetically impressed privileged direction.

FIGURE 5 shows, as a further development of the invention, a circular storage cell with the magnetic circuit closed almost on all sides through the highly permeable base. In the circular function region, indicated by parallel lines, a relatively thick non-magnetic intermediate layer lies between the storage layer and the base together with the printed co-ordinate wires 2, 3. In the annular marginal zone 5, shown in crossed lines, the storage layer adheres directly to the soft magnetic base 1. In this manner, appreciable demagnetizing fields do not appear in any direction at the margins of the layer despite its relatively low ratio of diameter to thickness, and in this respect it behaves like the known extremely thin storage spots with negligible demagnetization and the magnetic circuit closed in air. For this reason a similar use may be made of magnetically impressed anisotropy of the layer (for example in the direction of the wire 3 caused by a current flowing in the wire 2) during the application of the layer as in the known thin-layer storages without magnetic shunt.

It is possible similarly to the known switching method in the case of the extremely thin magnetic storage layers to superimpose a transversely directed field impulse component (current in the wire 3) on the switching field in the easy direction (current in the wire 2) and so cause reversal of the magnetism by partial or complete incoherent rotation which, despite the use of relatively weak currents, takes place considerably more quickly than the normal reversal of magnetism by means of boundary displacements in the examples discussed above.

It is also possible to give the easy direction of the storage layer, as shown in FIGURE 5, any other angular position in relation to the co-ordinate wires 2, 3 by appropriate fields during the application of the storage layer, for example by setting appropriate auxiliary currents in the conductors 2, 3. In this case, magnetization reversal by rotation may be obtained by the current through a single wire.

The switching times which can be achieved by this means (about 0.01 to 0.2 μs.) are admittedly considerably greater than the switching times of the very thin films (less than $10^{-3}$ μs.) reversing the magnetization by coherent rotation, but are very valuable technically, particularly in view of the fact that the signal voltages are substantially higher as a result of the greater permissible layer thickness.

A further advantage of the storage cells shown in FIGURE 5 lies in the possibility of very rapid non-destructive bipolar reading. This is effected by means of reversible angular rotation of the magnetization in respect to the privileged position during interrogation by a current-impulse driven through one of the two co-ordinate wires and reading the induced impulse voltage by means of the other.

Figure 6:
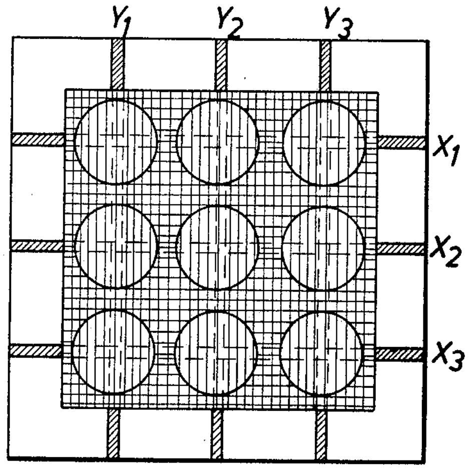
FIGURE 6 is a plan view of a matrix constructed of storage elements of the type shown in FIGURE 5.

FIGURE 6 shows diagrammatically, a section of a matrix comprising circular storage elements as shown in FIGURE 5. Here, too, the circles with parallel lines represent the actual storage region while the storage layer rests directly on the soft magnetic base in the intervening regions distinguished by crossed lines. The easy magnetic axis of the storage cells is set in the required direction by means of auxiliary currents in one or both coordinate directions during the deposition.

Figure 7:
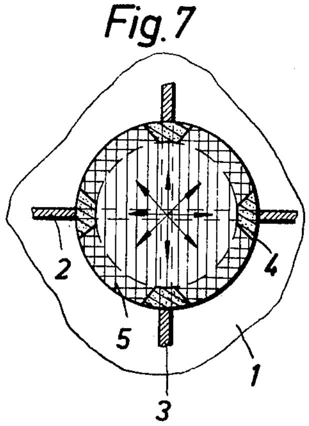
FIGURE 7 is a plan view of a further storage element having multi-axial form-anisotropy.

In a further development of the invention, uniaxial or multiaxial form-anisotropy may be imparted to the storage or switching cell instead of or in addition to the magnetically impressed uniaxial anisotropy. This may be effected by appropriate formation of the edge of the function region, that is to say by local interruptions in the iron path to the base. FIGURE 7 shows an example of a storage cell which is derived from the circular cell shown in FIGURE 5 by more or less wide recesses at the points where the wires emerge so that the nonmagnetic intermediate layer 4 becomes visible. As a result, a plurality of form anisotropies develop with corresponding directions of easy magnetization which are indicated by arrows in FIGURE 7. The magnetization can be adjusted in these easy directions by combining certain values of the impulse currents through the two coordinate wires. Such cells with multiple anisotropy open up additional possibilities for storage applications and afford greater logic flexibility or require fewer logic building blocks than the simple arrangements shown in FIGURES 1 and 2, which may be regarded as a special case of strong uni-directional form anisotropy. Furthermore, they render reversals of flux possible with small angular variations and hence shorter times or smaller field requirements.

In the field of magnetic logic, the invention renders possible logic circuits which are similar to those which are known from electrically coupled thin-layer elements (without a closed path through iron). This means to say that storage cells as shown in FIGURE 5 or 7 may be electrically coupled to form AND-circuits and OR-circuits, and the coupling lines may likewise be part of the whole circuit printed on the soft magnetic support.

In addition, the arrangement according to the invention enables logic operations to be carried out directly that is to say without the aid of coupling windings. The arrangements shown diagrammatically in FIGURES 8 and 9 illustrate this with reference to two simple examples.

Figure 8:
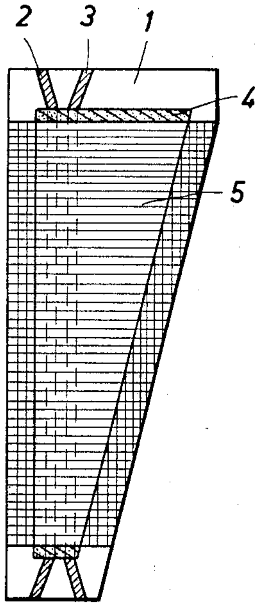
FIGURE 8 is a plan view of one embodiment of a magnetic logic arrangement.

FIGURE 8 shows an arrangement according to the invention which can serve for the storage and counting of pulse trains. Here the active part of the storage layer 5, which lies magnetically insulated on the highly permeable base 1 and which is indicated by parallel lines, is in the form of a truncated acute-angled triangle (function zone) under which the writing and reading wires 2 and 3, respectively, extend from the apex to the opposite side. If a reset pulse of adequate current strength is first caused to flow through the writing line 2, the whole triangular region of the storage film is magnetized transversely to the direction of current and remains in the corresponding remanence state. If the pulses to be counted (information pulses) which have opposite polarity are then sent through the same wire, each pulse causes a partial, strip-shaped reversal of magnetism in the triangular area, progressing from the apex to the opposite side. The distance by which the front of magnetic reversal is displaced by each information pulse corresponds to the magnitude of the voltage-time integral of this pulse. The counting off of a number of stored pulses is effected by interrogation by means of a pulse train of opposite polarity (polarity of the reset pulse) and corresponding to the full number. If its polarity coincides with that of the pulses to be counted, the reading wire records the complementary number.

The arrangement may also be used for the integration of any desired continuous voltage-time function, provided that the integral does not exceed the maximum available storage flux. The evaluation of the integral is effected by re-magnetization with a series of many small pulses of known magnitude and counting the voltage pulses induced in the reading line.

Figure 9:
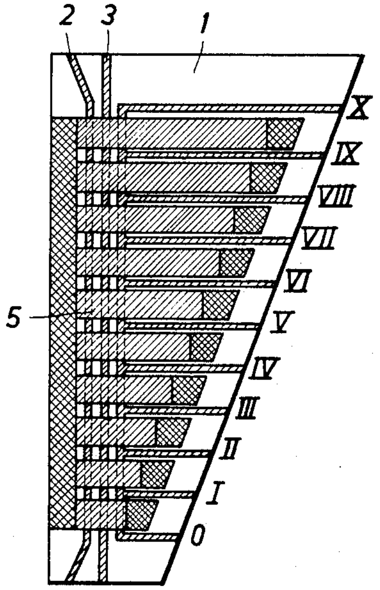
FIGURE 9 is a plan view of another embodiment of a magnetic logic arrangement.

FIGURE 9 illustrates diagrammatically a further development of the counting device shown in FIGURE 8. Here the function zone is divided into single strips of equal width which can be interrogated individually with regard to their state of magnetization by means of separate interrogation (0 to X). Thus a repeatable reading of each counter stage by two sequent pulses of opposite polarity is possible.

It will be appreciated that the arrangement shown in FIGURE 9 may also be used as a pulse-distributor device, that is to say for producing pulses which appear with time displacement at a series of output terminals (0 to X). In this case, the input wire 2 is fed with a uniform pulse train of an adequate voltage-time-integral. After each complete run-through of the magnetic-reversal front, the remagnetization is effected by means of a sufficiently large reset pulse through the input wire.

The arrangements discussed with reference to FIGURES 8 and 9 are only examples of numerous other logic operations which can be realized to advantage on the basis of the invention without coupling windings.

It will be understood that the above description of the present invention is susceptible to various modifications, changes and adaptations.

What is claimed is:

1. An arrangement for the magnetic storing, switching or logic combination of information, using thin magnetic storage layers covering those regions of a system of printed conductors where interaction with the storage layer is to take place, comprising, in combination:

(a) a soft magnetic, highly permeable base;

(b) a system of insulated conductors, printed on said base and having interaction regions corresponding to the desired function;

(c) a non-magnetic layer disposed on the interaction regions of the conductor system; and (d) a thin magnetic storage layer disposed on the interaction regions, and the zones around the interaction regions which are not covered by the non-magnetic layer and said soft magnetic base, said storage layer being formed by a pattern of storage layer strips crossing one another, the storage layer strips being applied directly to the soft magnetic base at the points of intersection and bridging the interaction regions on the surface of the non-magnetic layer.

2. An arrangement for the magnetic storing, switching or logic combination of information, using thin magnetic storage layers covering those regions of a system of printed conductors where interaction with the storage layer is to take place, comprising, in combination:

(a) a soft magnetic, highly permeable base;

(b) a system of insulated conductors, printed on said base and having interaction regions corresponding to the desired function;

(c) a non-magnetic layer disposed on the interaction regions of the conductor system; and (d) a thin magnetic storage layer disposed on the interaction regions, and the zones around the interaction regions which are not covered by the non-magnetic layer, said storage layer thus contacting said non-magnetic layer and said soft magnetic base, said storage layer disposed on the interaction regions being completely surrounded by the storage layer zones contacting the soft magnetic base except at the points where the conductors pass, said regions being in the form of a closed circular area; and (e) wherein the conductors cross one another at right angles and the storage layer in the interaction regions has an easy direction of magnetization which is impressed at a desired predetermined angle to the coordinate axes of the conductors by passing auxiliary currents through the conductors during application of the storage layer.

3. An arrangement for the magnetic storing, switching or logic combination of information, using thin magnetic storage layers covering those regions of a system of printed conductors where interaction with the storage layer is to take place, comprising, in combination:

(a) a soft magnetic, highly permeable base;

(b) a system of insulated conductors, printed on said base and having interaction regions corresponding to the desired function;

(c) a non-magnetic layer disposed on the interaction regions of the conductor system; and (d) a thin magnetic storage layer disposed on the interaction regions, and the zones around the interaction regions which are not covered by the non-magnetic layer, said storage layer thus contacting said non-magnetic layer and said soft magnetic base; and (e) wherein the edges of the interaction regions are defined by a plurality of recesses in the magnetic connection between the storage layer and the soft magnetic base to provide corresponding magnetic form anisotropy of the storage layer, with a plurality of easy directions.

4. An arrangement for carrying out logic operations without the aid of special electrical coupling lines and for the storage and counting of pulse trains, comprising in combination:

a soft magnetic, highly permeable base;

a system of insulated conductors corresponding to the desired function printed on said base and having function regions;

a non-magnetic layer disposed on the function regions of the conductor system; and a thin magnetic storage layer disposed on the function regions, which are those regions where interaction between the conductors and the storage layer is to take place, and on zones around the function regions which are not covered by the non-magnetic layer thus contacting the soft magnetic base, the magnetization of the function regions being varied by displacement of the boundaries between oppositely magnetized portions or by angular turning of remanence flux, said storage layer disposed on the function regions being wedge-shaped, the magnetism of the wedge being reversed in strips by voltage pulses at the input of a writing or interrogation line extending in the logitudinal direction of the wedge.

5. An arrangement as defined in claim 2 wherein reversal of magnetism and reading is effected by non-coherent rotation by means of pulse fields which are inclined in relation to said easy direction of magnetization and are produced by currents in at least one conductor direction.

6. An arrangement as defined in claim 4 wherein the wedge-shaped function region of the storage film is divided into individual parallel strips of graduated length, and associated reading lines for interrogating the strips individually and repeatedly.

7. An arrangement as defined in claim 6 wherein there is an input line which may be fed with a uniform pulse train so that the time displaced output pulses can be picked up at the reading lines of the individual strips to thus act as a pulse distributor.

References Cited

UNITED STATES PATENTS

| | | | |
|---|---|---|---|
| 3,212,072 | 10/1965 | Fuller | 340—174 |
| 3,229,265 | 1/1966 | Brownlow et al. | 340—174 |
| 3,276,000 | 9/1966 | Davis | 340—174 |
| 3,278,913 | 10/1966 | Raffel | 340—174 |
| 3,305,845 | 2/1967 | Grace et al. | 340—174 |
| 3,340,517 | 9/1967 | Van de Riet | 340—174 |
| 3,375,503 | 10/1966 | Berrelsen | 340—174 |

FOREIGN PATENTS

| | | |
|---|---|---|
| 367,854 | 10/1958 | Switzerland. |

STANLEY M. URYNOWICZ, Jr., Primary Examiner

V. P. CANNEY, Assistant Examiner